(12) United States Patent
Kole

(10) Patent No.: US 6,683,912 B1
(45) Date of Patent: Jan. 27, 2004

(54) COMMUNICATION BUS SYSTEM

(75) Inventor: Marcus E. Kole, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/510,854

(22) Filed: Feb. 23, 2000

(30) Foreign Application Priority Data

Feb. 25, 1999 (EP) .............................................. 99200548

(51) Int. Cl.[7] ................................................ H04B 3/00
(52) U.S. Cl. ...................... 375/257; 375/288; 375/316; 333/32; 710/305
(58) Field of Search ................................ 375/257, 286, 375/288, 316, 317, 319, 346; 710/8, 62, 64, 107, 110, 316, 302, 305, 306; 326/30; 340/310.05; 333/17.3, 32

(56) References Cited

U.S. PATENT DOCUMENTS

| | | | | |
|---|---|---|---|---|
| 5,781,028 A | * | 7/1998 | Decuir | 326/30 |
| 6,012,103 A | * | 1/2000 | Sartore et al. | 710/8 |
| 6,131,134 A | * | 10/2000 | Huang et al. | 710/302 |
| 6,141,719 A | * | 10/2000 | Rafferty et al. | 710/316 |
| 6,279,060 B1 | * | 8/2001 | Luke et al. | 710/64 |
| 6,301,628 B1 | * | 10/2001 | Janssens | 710/110 |
| 6,460,094 B1 | * | 10/2002 | Hanson et al. | 710/8 |

FOREIGN PATENT DOCUMENTS

EP    19715455 A    10/1998    ........... G06F/13/38

* cited by examiner

Primary Examiner—Chieh M. Fan

(57) ABSTRACT

A communication bus system comprises a pair of conductors for carrying differential bus signals. A first and second station are connected by the pair of conductors. The system is operable in a selectable one of at least a low speed mode and a high-speed mode. The second station contains resistors each in series with a switch between the pair of conductors and a common node. The impedance connection circuit connects common node to the pair of conductors in the high-speed mode. The resistors provide an impedance to the pair of conductors that substantially matches the transmission line impedance of the pair of conductors. The common point is kept at a bias potential that differs from the reference potential of the receiving circuit. Preferably, a third switch is included between the nodes that join the resistors to the switches. This third switch is switched on and off together with the other switches.

6 Claims, 1 Drawing Sheet

COMMUNICATION BUS SYSTEM

BACKGROUND AND SUMMARY

The invention relates to a communication bus system comprising a pair of conductors for carrying differential bus signals. The system comprises a first and second station connected by the pair of conductors. The system is operable in a selectable one of at least a low speed mode and a high-speed mode. The first and second stations communicate via the pair of conductors to control switching between the high-speed mode and the low speed mode. This may be realized for example using the USB protocol in the slow speed mode when the conductors are part of a USB (Universal Serial Bus) connection.

The first station contains driver circuitry for driving electrical signals on the pair of conductors. The second station contains receiver circuitry for receiving the signals. The second station also contains an impedance circuit and an impedance connection circuit between the pair of conductors and the impedance circuit. The impedance connection circuit connects the impedance circuit to the pair of conductors in the high-speed mode and the low speed mode respectively.

In the high speed mode the impedance circuit provides a impedance to the pair of conductors that substantially matches the transmission line impedance of the pair of conductors. Preferably, the pair of conductors runs surrounded by electrical shielding. In that case, the transmission line impedance comprises mainly impedance components between the shielding and each of the conductors of the pair. In this case, the impedance circuit provides two impedances between respective ones of the conductors of the pair and a common point that is AC coupled to the shielding.

The impedance circuit ensures that there are substantially no transmission line reflections back from the second station in the high-speed mode. This makes it possible to uses the system with very high signal frequency components in the high-speed mode. On the other hand, no (low) impedance is connected to the conductors in the low speed mode, thus saving power consumption and ensuring compatibility a specification of the low speed mode.

In order to enable the receiving circuit to operate properly the common point is preferably kept at a bias potential which differs from the reference potential of the receiving circuit, which is normally the potential of the shielding. Additionally, the bias potential can be used to observe that the second station is actually operating in the high-speed mode, so that the first station can switch to that mode and back to the slow speed mode.

A bias voltage source is provided between the common point and the shielding for this purpose. Use of one bias source to determine the bias voltage for both conductors of the pair via the common point ensures bias voltage symmetry between the conductors. This makes signal reception more reliable.

Preferably, the second station contains a third switch connected between a first and second point, the first point lying between the first resistor and the first switch, the second point lying between the second resistor and the second switch. The second station controls the third switch just like the first and second switch, so that the third switch is made conductive in the high-speed mode and non-conductive in the low speed mode.

DETAILED DESCRIPTION

Figure 1:
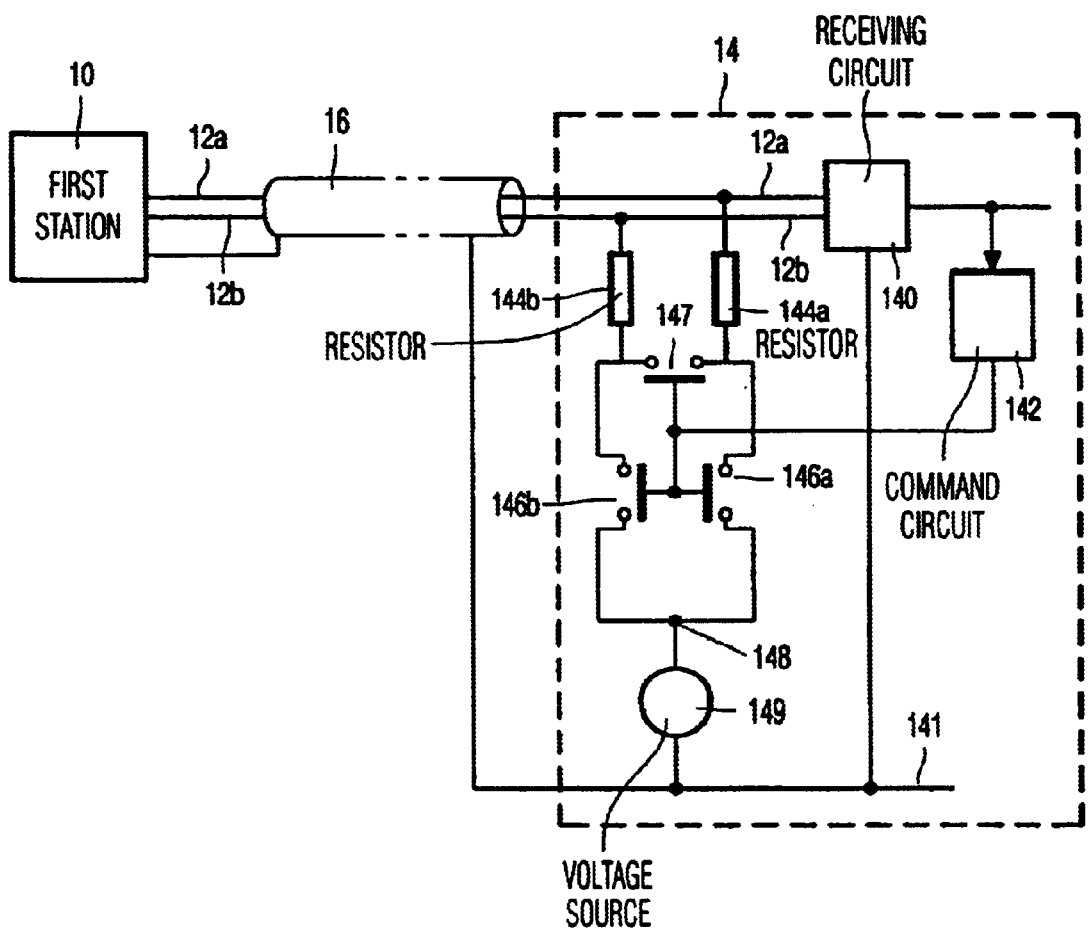
FIG. 1 shows a communication bus system.

The system of FIG. 1 comprises a first station 10, a second station 14, a pair of conductors 12a–b. The first station 10 is connected to the second station 14 via the pair of conductors 12a,b, which run inside a shielding 16.

The second station 14 comprises a receiving circuit 140 connected to the conductors 12a,b, an impedance circuit 144a,b, an impedance switching circuit 142, 146a,b, 147 and a bias voltage source 149.

The impedance connection circuit 142, 146a,b, 147 comprises a command circuit 142 and a first and second switch 146a,b. The impedance circuit 144a,b comprises a first an second resistor 144a,b, the common point 148 being connected to a first one of the conductors 12a of the pair successively via the first switch 146a and the first resistor 144a, the common point 148 being connected to a second one of the conductors 12b of the pair successively via the second switch 146b and the second resistor 144b.

The resistance of both resistors 144a,b is for example substantially 45 ohms when the transmission line impedance between the each one of the conductors and the shielding is 45 ohms.

The second station 14 controls the first and second switch 144a,b so that they are made conductive in the high-speed mode and non-conductive in the low speed mode. Thus, a matched (low) impedance is seen at the end of the transmission line formed by the conductors 12a,b and the shielding 16 in the high speed mode and the common mode of the voltages at the conductors 12a,b is kept at a bias voltage level determined by the voltage source 149 in the high-speed mode. Asymmetry between impedances of the conductors 12a,b, DC voltages on the conductors 12a,b and the frequency dependence of these voltages and impedances is realized by using a voltage source 149 in common for both conductors 12a,b. Preferably, the voltage source 149 is regulated so that the common mode voltage of the conductors 12a,b is regulated to a predetermined bias value in the high speed mode.

In FIG. 1, the state of the switches corresponding to the low speed mode is shown. Preferably, the second station 14 receives signals with the receiving circuit 140 via the conductors 12a,b in the low speed mode. The received signals are fed to the command circuit 142, which interprets these signals to determine whether they imply a command to switch to the high speed mode (the command circuit may be realized as a programmed microcontroller, for example). If so, the command circuit 142 controls the switches to become conductive as long as the second station 14 remains in the high-speed mode.

Switching between the two modes is thus controlled by commands transmitted by the first station 10, for example using the known USB protocol. The first station can detect whether the second station has switched to the high speed mode or not by monitoring the common mode voltage of the conductors 12a,b relative to the shielding 16.

Preferably each switch 146a,b comprises a respective MOS (IGFET) transistor with a main current channel connected between the common point and the relevant resistor and a control electrode whose potential is determined by the second station dependent on the selected mode.

Preferably, the second station 14 contains a third switch 147 connected between a first and second point. The first point lying between the first resistor 144a and the first switch 146a, the second point lying between the second resistor 144b and the second switch 146b. The second station 14 controls the third switch 147 just like the first and second switch 146*a,b*, so that the third switch 147 is made conductive in the high speed mode and non-conductive in the low speed mode. Preferably the third switch 147 also comprises a MOS (IGFET) transistor with a main current channel connected between the common point and the relevant resistor 144*a,b* and a control electrode whose potential is determined by the second station 14 dependent on the selected mode.

The third switch 147 improves the connection between the resistors 144*a,b*, so that the impedance provided by the resistors 144*a,b* and the switches more closely matches the transmission line impedance of the conductors 12*a,b*. This reduces the consequences of imperfections in the first and second switch 12*a,b*.

In an alternative embodiment the common point 148 is kept at the potential of the shielding 16 and a channel coding is used that ensures a DC component of the signals on the conductors 12*a,b* within a predetermined range that can be used by the receiving circuit.

As an alternative to using such a channel coding or in combination therewith, the common point 148 may be connected to the shielding 16, with the bias voltage source connected between the common point 148 and the reference voltage point of the receiving circuit 140.

What is claimed is:

1. A communication bus system comprising: a first station, a second station and a pair of conductors connecting the first station to the second station, the second station comprising a receiving circuit for receiving differential signals transmitted by the first station over the pair of conductors, the system being operable in a selectable one of at least a low speed mode and a high speed mode, the second station also comprising:

a bias voltage source connected between a reference point of the receiving circuit and a common point, a first and a second resistor;

a first and second switch, the common point being connected to a first and second one of the conductors, via a first and second series arrangement respectively, the first series arrangement comprising successively the common point, the first switch, a first node and the first resistor and the second series arrangement comprising successively the common point, the second switch, a second node and the second resistor; and a third switch between the first and second node, the second station controlling the first, second and third switches to be non-conductive and conductive in the low and the high speed mode, respectively.

2. A communication bus system as recited in claim 1, wherein a switching between the low speed mode and the high speed mode is controlled via commands from the first station.

3. A communication bus system as recited in claim 1, wherein the first, second and third switches each includes an insulated gate field effect transistor (IGFET).

4. A communication bus system as recited in claim 3, wherein the IGFET of the third switch includes a main current channel, which is connected between the common point and either the first resistor or the second resistor, and a control electrode, which has a potential that is determined by the second station.

5. A communication bus system as recited in claim 1, wherein the common point is maintained at a potential of a shielding and a channel coding is used that ensures a DC component of signals on the pair of conductors is within a range that can be used by the receiving circuit.

6. A communication bus system as recited in claim 1, wherein the common point is connected to a shielding.

* * * * *